(12) United States Patent
Howard

(10) Patent No.: US 10,752,095 B2
(45) Date of Patent: Aug. 25, 2020

(54) WINDOW

(71) Applicant: Optic Armor, LLC, Linn Creek, MO (US)

(72) Inventor: James Howard, Linn Creek, MO (US)

(73) Assignee: Optic Armor, LLC, Linn Creek, MO (US)

( * ) Notice: Subject to any disclaimer, the term of this patent is extended or adjusted under 35 U.S.C. 154(b) by 156 days.

(21) Appl. No.: 15/956,503

(22) Filed: Apr. 18, 2018

(65) Prior Publication Data

US 2018/0312047 A1    Nov. 1, 2018

Related U.S. Application Data

(60) Provisional application No. 62/490,987, filed on Apr. 27, 2017.

(51) Int. Cl.
*B60J 1/00* (2006.01)
*B60J 1/20* (2006.01)

(52) U.S. Cl.
CPC ............. *B60J 1/007* (2013.01); *B60J 1/00* (2013.01); *B60J 1/2094* (2013.01)

(58) Field of Classification Search
CPC ............ B60J 1/007; B60J 1/00; B60J 1/2094
USPC ................................ 296/84.1, 96.14, 146.15
See application file for complete search history.

(56) References Cited

U.S. PATENT DOCUMENTS

| | | | | |
|---|---|---|---|---|
| 2,567,353 | A * | 9/1951 | Ryan | B32B 17/10761 52/208 |
| 3,061,490 | A * | 10/1962 | Ryan | B32B 17/10798 428/81 |
| 7,152,906 | B1 * | 12/2006 | Farrar | B60J 1/007 296/146.15 |
| 8,528,258 | B1 * | 9/2013 | Perry | B60J 1/025 296/146.15 |
| 2001/0032422 | A1 * | 10/2001 | Farrar | B60J 1/2094 52/204.5 |
| 2009/0304970 | A1 * | 12/2009 | Imaizumi | B29C 45/1615 428/38 |
| 2015/0298527 | A1 * | 10/2015 | Sitko | B60J 1/006 296/201 |
| 2016/0332423 | A1 * | 11/2016 | Yamada | B60J 1/00 |
| 2017/0282938 | A1 * | 10/2017 | Kleitsch | B61D 25/00 |
| 2018/0056759 | A1 * | 3/2018 | Andersson | F41H 5/263 |
| 2018/0119478 | A1 * | 5/2018 | Lahnala | E06B 3/5454 |

* cited by examiner

*Primary Examiner* — Jason S Morrow
(74) *Attorney, Agent, or Firm* — Stinson LLP

(57) ABSTRACT

A window for use in a vehicle includes a plastic base sheet having an inner surface and an outer surface. A glass sheet is attached to the plastic base sheet. The glass sheet has an inner surface and an outer surface. The inner surface of the glass sheet faces the outer surface of the plastic base sheet. A plastic frame sheet is attached to the plastic base sheet. The plastic frame sheet has an inner surface and an outer surface. The inner surface of the plastic frame sheet faces the outer surface of the plastic base sheet. The plastic frame sheet has an opening exposing at least a portion of the glass sheet through the opening.

6 Claims, 7 Drawing Sheets

WINDOW

CROSS-REFERENCE TO RELATED APPLICATION

The present application claims the benefit of, and priority to, U.S. Provisional Application Ser. No. 62/490,987, which was filed Apr. 27, 2017, and which is incorporated herein by reference in its entirety for all purposes.

FIELD

The present invention generally relates to vehicle windows. In particular, the present invention relates to a plastic and glass window.

SUMMARY

In one aspect, a window for use in a vehicle generally comprises a plastic base sheet having an inner surface and an outer surface. A glass sheet is attached to the plastic base sheet. The glass sheet has an inner surface and an outer surface. The inner surface of the glass sheet faces the outer surface of the plastic base sheet. A plastic frame sheet is attached to the plastic base sheet. The plastic frame sheet has an inner surface and an outer surface. The inner surface of the plastic frame sheet faces the outer surface of the plastic base sheet. The plastic frame sheet has an opening exposing at least a portion of the glass sheet through the opening.

In another aspect, a method of making a window generally comprises providing a plastic base sheet having an inner surface and an outer surface. Attaching a glass sheet to the plastic base sheet such that an inner surface of the glass sheet faces the outer surface of the plastic base sheet. Attaching a plastic frame sheet to the plastic base sheet such that an inner surface of the plastic frame sheet faces the outer surface of the plastic base sheet. Exposing at least a portion of the glass sheet through an opening in the plastic frame sheet.

BACKGROUND

Plastic windows such as polycarbonate and acrylic windows may be desirable for use on certain vehicles because of their superior shatter resistance to traditional glass windows. However, glass windows are known to have superior scratch resistance than windows made from plastic. One attempt at improving the scratch resistance of plastic windows has been to apply a scratch resistant coating to the plastic material. Additionally, composite windows using multiple sheets/layers including a plastic base layer and glass overlay are known.

BRIEF DESCRIPTION OF THE DRAWINGS

Corresponding reference characters indicate corresponding parts throughout the drawings.

DESCRIPTION OF THE PREFERRED EMBODIMENTS

Figure 1:
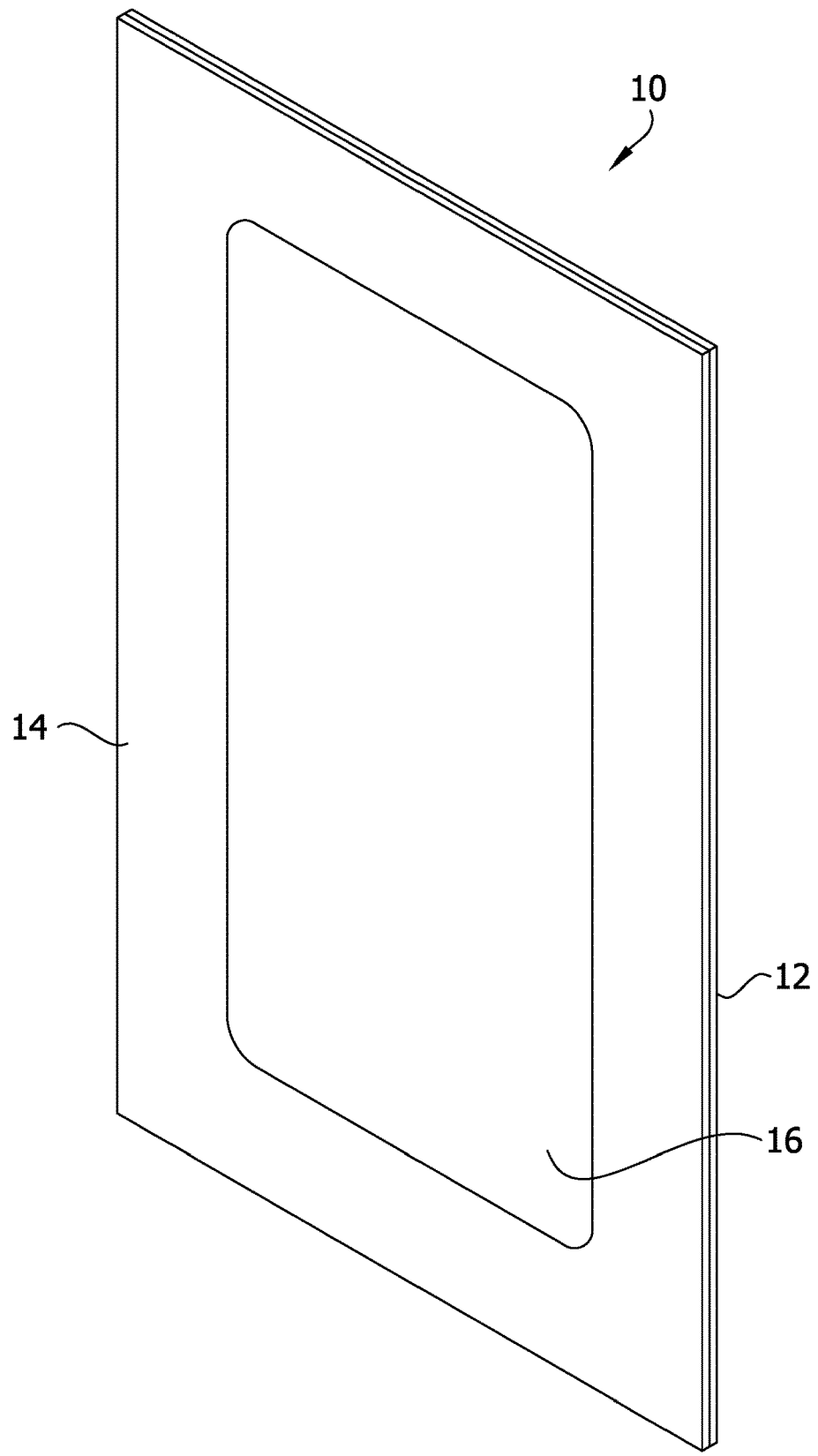
FIG. 1 is a perspective view of a window.
Figure 2:
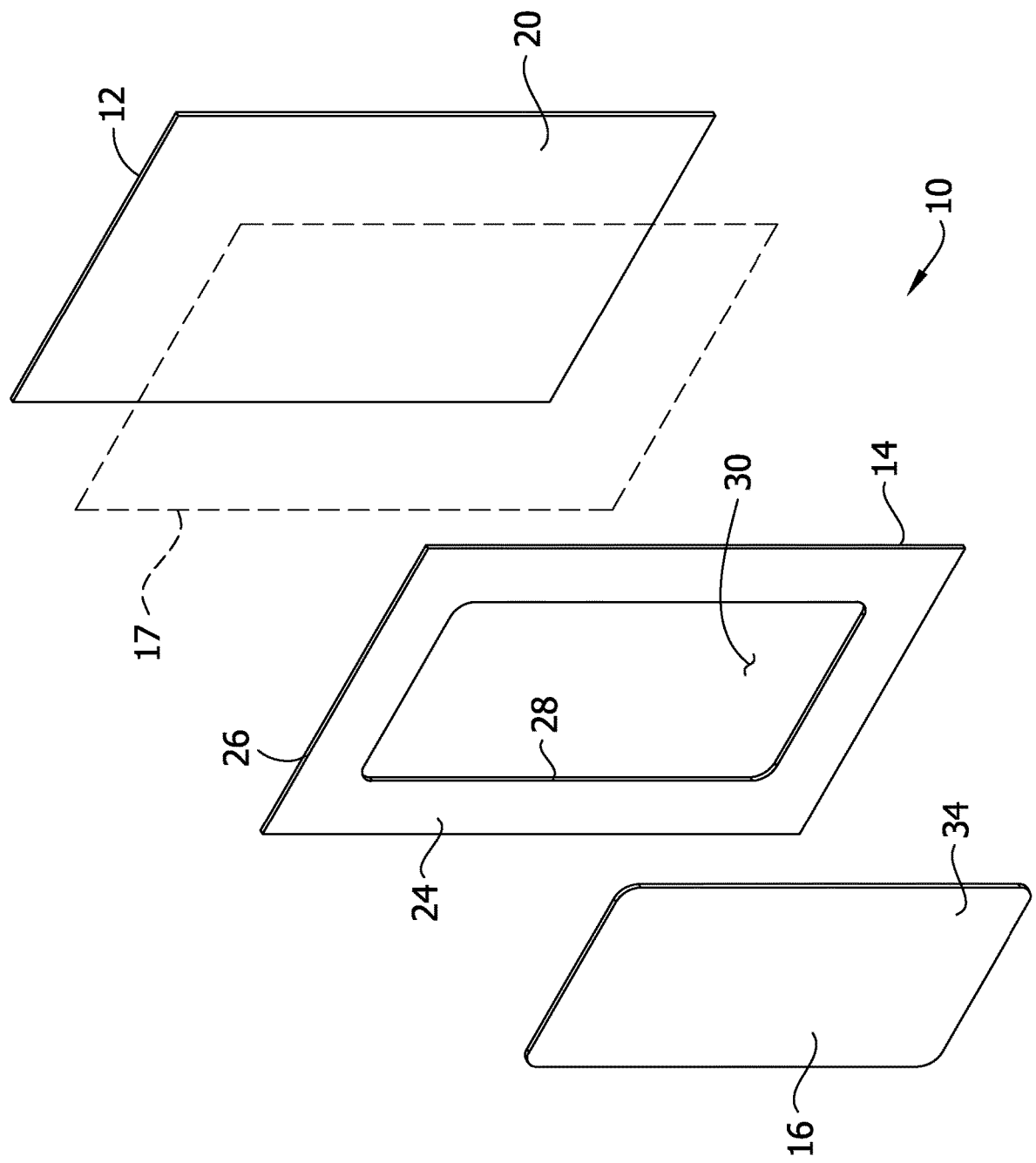
FIG. 2 is an exploded view of the window showing an interlayer for bonding layers of the window together.
Figure 3:
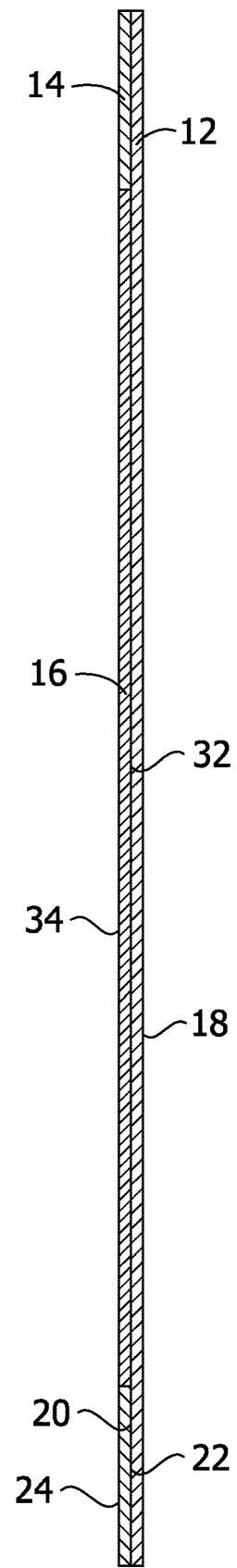
FIG. 3 is a section of the window.
Figure 4:
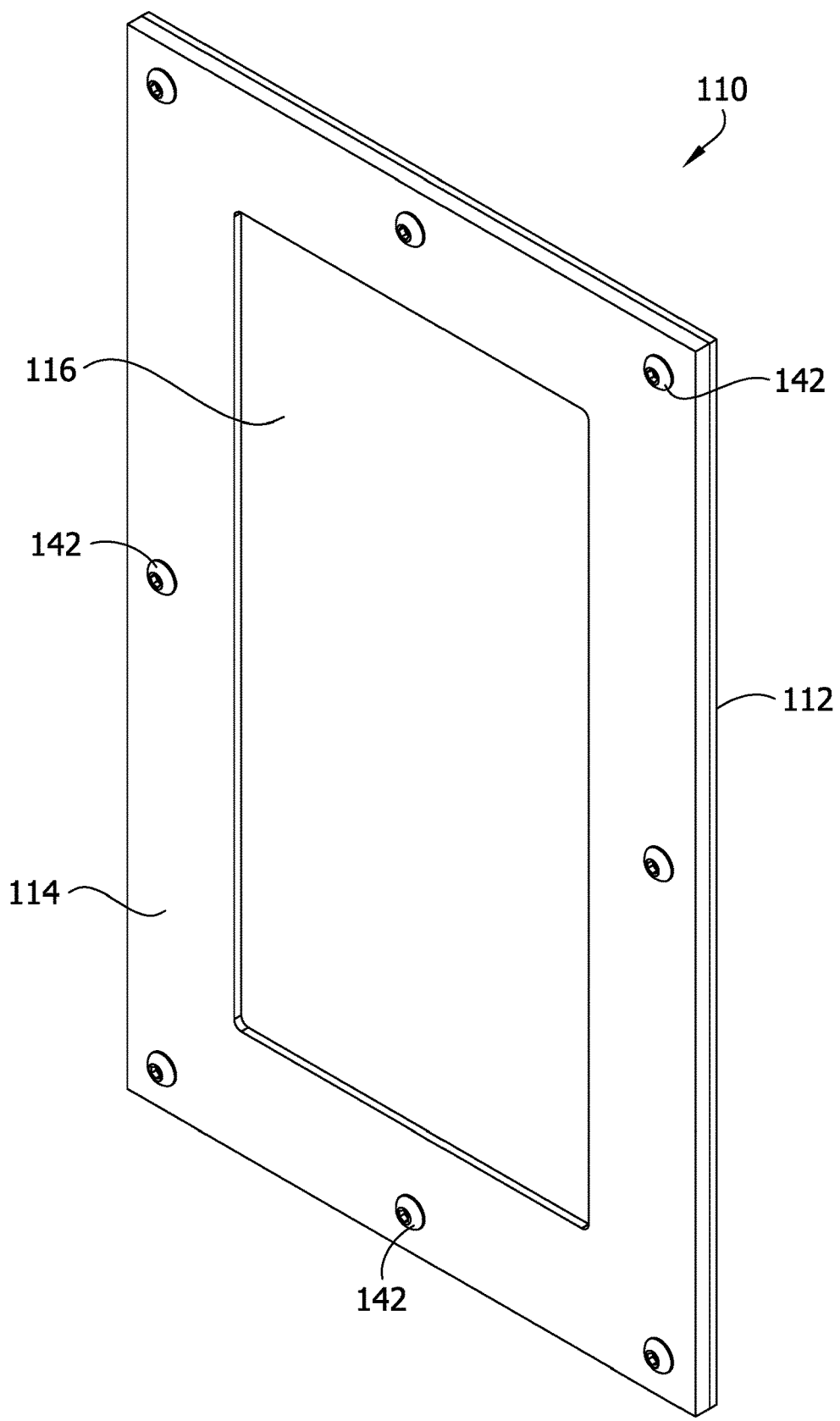
FIG. 4 is a perspective view of a window of another embodiment.
Figure 5:
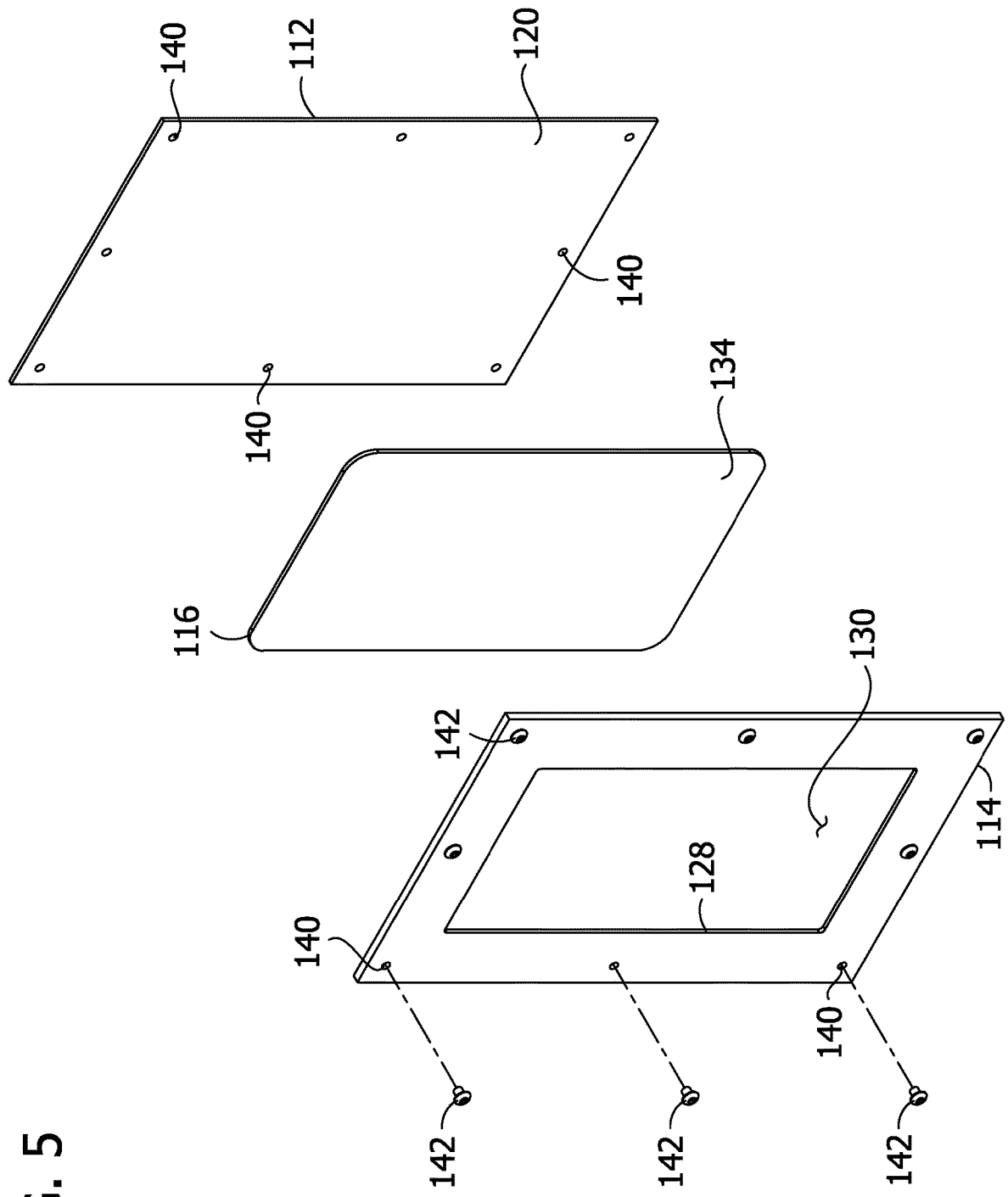
FIG. 5 is an exploded view of the window in FIG. 4.
Figure 6:
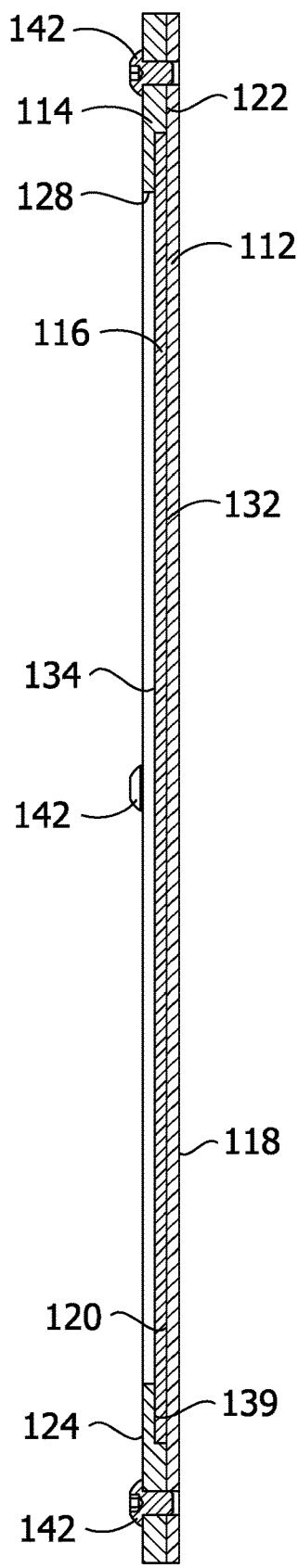
FIG. 6 is a section of the window in FIG. 4.
Figure 7:
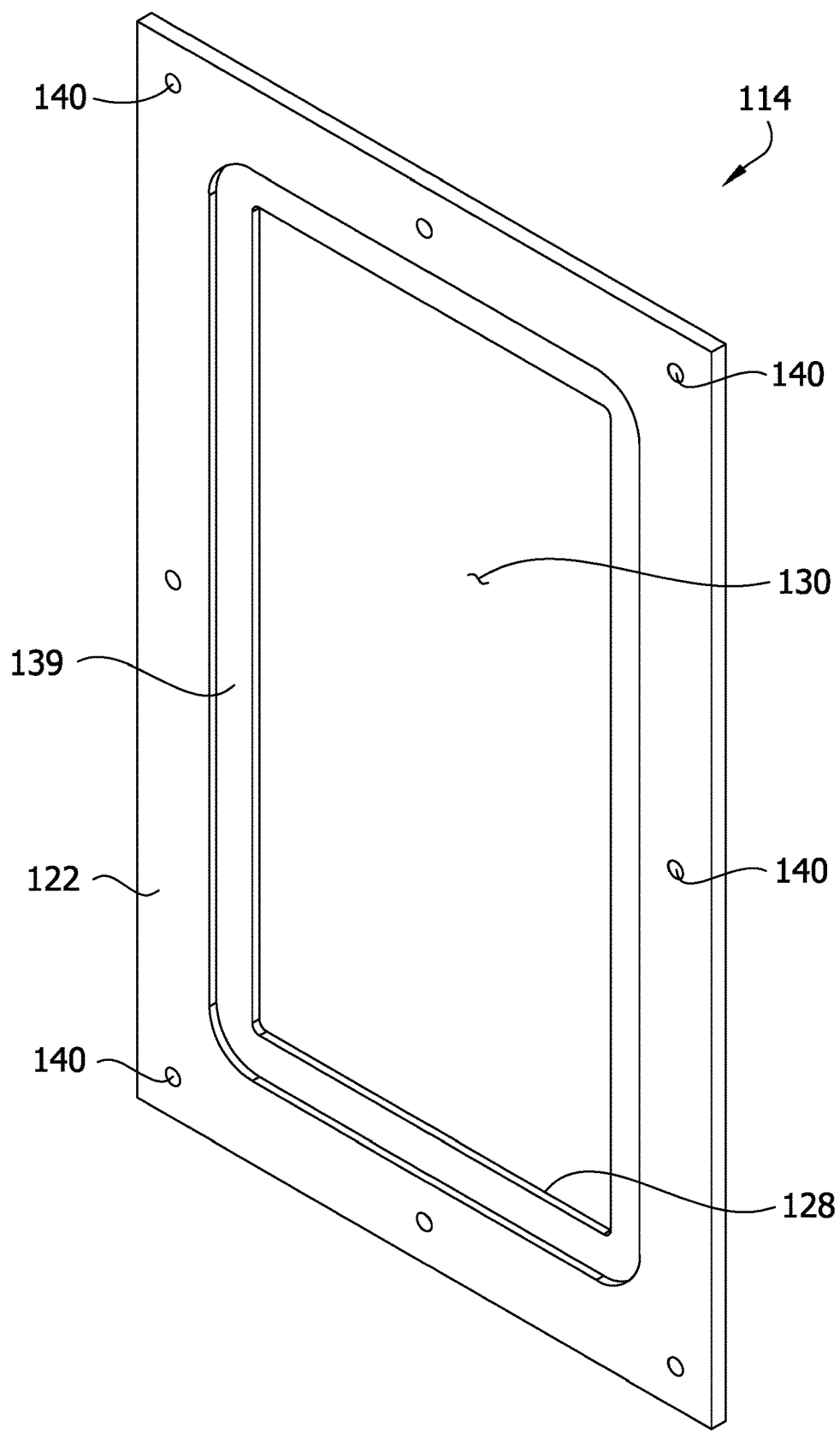
FIG. 7 is a rear perspective of a frame layer of the window in FIG. 4.

Referring now to the drawings, FIGS. 1-3 illustrate a window, generally indicated at 10, suitably adapted to be mounted onto a frame of a vehicle. The window 10 has a plastic and glass laminate construction and may be configured for use as a window/windshield for automotive vehicles (e.g., commercial vehicles and racing cars), power sports vehicles (e.g., motorcycles, all-terrain vehicles, utility vehicles, watercrafts, etc.), as well as industrial applications for construction and farming vehicles. The plastic and glass construction of the window 10 configures the window to have the shatter resistant properties of a plastic material along with the scratch resistant properties of glass. This construction is an improvement over prior art plastic windows which use a scratch resistant coating on an exterior surface of a plastic material to enhance the window's scratch resistance.

The window 10 comprises a first plastic base layer 12, a second plastic frame layer 14 disposed over the base layer, and a glass insert layer 16 at least partially received in the frame layer and disposed over the base layer. The layers 12, 14, 16 may be suitably attached as will be understood by person's skilled in the art. For example, a bonding agent such as an interlayer film (e.g., urethane film) 17 (FIG. 2) can be inserted between the layers and liquefied in an autoclave to bond the layers together. Other means for attaching the layers together are envisioned without departing from the scope of the disclosure. In one embodiment, an adhesive can be used to attach the layers together.

The first plastic base layer 12 comprises a sheet of plastic material having an inner surface 18 and an outer surface 20. The second plastic frame layer 14 comprises a sheet of plastic material having an inner surface 22 and an outer surface 24. The inner surface 22 of the frame layer 14 is disposed opposite the outer surface 20 of the base layer 12. An outer edge 26 of the frame layer 14 defines a perimeter of the frame layer. An interior edge 28 of the frame layer 14 defines a boundary of a cutout 30 within the frame layer. In the illustrated embodiment, the cutout 30 has a generally rectangular shape. However, the cutout could have other shapes without departing from the scope of the disclosure. The glass insert layer 16 comprises a sheet of glass having an inner surface 32 and an outer surface 34. The cutout 30 in the frame layer 14 is sized and shaped to receive at least a portion of the glass insert layer 16 such that at least a portion of inner surface 32 of the insert layer is disposed opposite the outer surface 20 of the base layer 12. In the illustrated embodiment, an entirety of the glass insert layer 16 is disposed within the cutout 30 in the frame layer 14 such that the entire inner surface 32 of the insert layer is disposed opposite the outer surface 20 of the base layer 12. However, it is envisioned that least some of the glass insert layer 16 can extend past the interior edge 28 of the frame layer 14.

One suitable material for the plastic base layer 12 and plastic frame layer 14 is a polycarbonate and/or acrylic material. However, other plastic materials are envisioned without departing from the scope of the disclosure. Also, it is envisioned that the base layer 12 and frame layer 14 can be made from different plastic materials. The glass insert layer 16 can be formed from any suitable glass material. For example, the insert layer 16 can be formed from standard commercial glass, Gorilla® Glass, chemically strengthened glass, or flexible glass. Also, additional coatings or layers can be added or applied to the window 10 without departing from the scope of the disclosure.

In the illustrated embodiment, the base layer 12, frame layer 14, and insert layer 16 are shown as generally rectangular sheets. However, the layers 12, 14, 16 could have other shapes, such as any shape consistent with the shape of a window/windshield, without departing from the scope of the disclosure. Additionally, although each layer 12, 14, 16 is shown as a single layer sheet, one or all of the sheets could comprise multiple layers of material suitably attached to each other to form a single sheet.

To assemble the window 10, an interlayer of bonding material 17 is placed on the outer surface 20 of the base layer 12. The plastic frame layer 14 is aligned with and placed on top of the plastic base layer 12 over the interlayer. The glass insert layer 16 is centered and placed on top of the plastic base layer 12, over the interlayer, and within the cutout 30 of the frame layer 14. The plastic base layer 12, interlayer 17, plastic frame layer 14, and glass insert layer 16 are then placed in an autoclave. In the autoclave, the layers are heated and pressed together causing the interlayer 17 to melt forming the bonding agent between the layers.

Referring to FIGS. 4-7, a window of a second embodiment is generally indicated at 110. The window 110 comprises a first plastic base layer 112, a glass insert layer 116 disposed over the base layer, and a second plastic frame layer 114 disposed over the glass layer. The layers 112, 114, 116 may be suitably attached as will be understood by person's skilled in the art. In the illustrated embodiment, fastener holes 140 are formed along edge margins of the base layer 112 and frame layer 114. Fasteners 142 are received through the fastener holes 140 to secure the layers 112, 114, 116 together. Other means for attaching the layers together are envisioned without departing from the scope of the disclosure. In one embodiment, a gasket (not shown) is used to keep dirt from getting between the layers.

The first plastic base layer 112 comprises a sheet of plastic material having an inner surface 118 and an outer surface 120. The glass insert layer 116 comprises a sheet of glass having an inner surface 132 and an outer surface 134. The second plastic frame layer 114 comprises a sheet of plastic material having an inner surface 122 and an outer surface 124. The inner surface 132 of the insert layer 116 is disposed opposite the outer surface 120 of the base layer 112. The inner surface 122 of the frame layer 114 is disposed opposite the outer surface 120 of the base layer 112 and disposed opposite the outer surface 134 of the insert layer 116. An interior edge 128 of the frame layer 114 defines a boundary of a cutout 130 within the frame layer. In one embodiment, the interior edge 128 is chamfered. The cutout 130 in the frame layer 114 is sized smaller than the insert layer 116 such that an edge margin of the insert layer 116 extends past the boundary defined by the interior edge 128 of the frame layer. Therefore, a portion of inner surface 122 of the frame layer 114 is disposed opposite the outer surface 120 of the base layer 112, and a portion of the inner surface of the frame layer is disposed opposite the outer surface 134 of the insert layer 116. In the illustrated embodiment, the inner surface 122 of the frame layer 114 has a recessed portion 139 (FIG. 7) which receives the edge margin of the insert layer 116. In one embodiment, the recessed portion 139 allows the inner surface 132 of the insert layer 116 to be generally flush with the inner surface 122 of the frame layer 114. The fasteners 142 secure all the layers together. In particular, the fasteners 142 directly secure the frame layer 114 to the base layer 112 which causes the frame layer and base layer to provide a squeezing force against the insert layer 116 holding the insert layer between the frame layer and base layer. Because the inert layer 116 is sized larger than the cutout 130 in the frame layer 114, the insert layer is prevented from being removed from between the base layer 112 and frame layer.

To assemble the window 110, the glass insert layer 116 is positioned and placed on the outer surface 120 of the plastic base layer 112. The plastic frame layer 114 is then aligned with the base layer 112 and placed on top of the base layer and glass insert layer 116. The frame layer 114 is positioned relative to the insert layer 116 so that the insert layer is contained within the recessed portion 139 of the frame layer. The fastener holes 140 in the frame layer 114 are aligned with the fastener holes 140 in the base layer 112. The fasteners 142 are then inserted into the fastener holes 140 securing the layers 112, 114, 116 together.

When introducing elements of aspects of the invention or the examples and embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several examples, embodiments, adaptations, variations, alternatives and uses of the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various examples and embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A window for use in a vehicle, the window comprising:
a plastic base sheet having an inner surface and an outer surface;

a glass sheet attached to the plastic base sheet, the glass sheet having an inner surface and an outer surface, the inner surface of the glass sheet facing the outer surface of the plastic base sheet; and a plastic frame sheet attached to the plastic base sheet, the plastic frame sheet having an inner surface and an outer surface, the inner surface of the plastic frame sheet facing the outer surface of the plastic base sheet, the plastic frame sheet having an opening exposing at least a portion of the glass sheet through the opening.

2. The window of claim 1, wherein the opening in the plastic frame sheet is sized and shaped to expose a majority of the glass sheet through the opening.

3. The window of claim 2, wherein an entirety of the glass sheet is exposed through the opening.

4. The window of claim 1, wherein the plastic base sheet, glass sheet, and plastic frame sheet are laminated together.

5. The window of claim 1, further comprising fasteners attaching the plastic frame sheet to the plastic base sheet.

6. The window of claim 1, wherein the plastic base sheet and the plastic frame sheet are made from one of a polycarbonate and acrylic material.

* * * * *